(12) United States Patent
Elbert et al.

(10) Patent No.: US 10,405,027 B2
(45) Date of Patent: Sep. 3, 2019

(54) CLOUD DVR SYSTEM WITH RETROACTIVE RECORDING

(71) Applicant: Cisco Technology, Inc., San Jose, CA (US)

(72) Inventors: Dan Elbert, Jerusalem (IL); Dany Kharitonsky, Kfar Adumim (IL); Clint Ricker, Lawrenceville, GA (US); David S. Morgan, Apex, NC (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 15/829,926

(22) Filed: Dec. 3, 2017

(65) Prior Publication Data
US 2019/0174175 A1  Jun. 6, 2019

(51) Int. Cl.
| | |
|---|---|
| *H04N 5/76* | (2006.01) |
| *H04N 5/93* | (2006.01) |
| *H04N 21/433* | (2011.01) |
| *H04N 21/258* | (2011.01) |
| *H04N 21/45* | (2011.01) |
| *H04N 21/435* | (2011.01) |
| *H04N 21/235* | (2011.01) |
| *H04N 21/231* | (2011.01) |
| *H04N 21/232* | (2011.01) |
| *H04N 21/4335* | (2011.01) |
| *G11B 27/00* | (2006.01) |
| *H04N 9/80* | (2006.01) |

(52) U.S. Cl.
CPC ..... *H04N 21/4334* (2013.01); *H04N 21/2323* (2013.01); *H04N 21/2353* (2013.01); *H04N 21/23109* (2013.01); *H04N 21/23113* (2013.01); *H04N 21/25891* (2013.01); *H04N 21/435* (2013.01); *H04N 21/4332* (2013.01); *H04N 21/4335* (2013.01); *H04N 21/4532* (2013.01)

(58) Field of Classification Search
USPC ....... 386/291, 299, 298, 296, 295, 294, 293, 386/278, 280, 239
See application file for complete search history.

(56) References Cited

U.S. PATENT DOCUMENTS

| | | |
|---|---|---|
| 8,433,815 B2 | 4/2013 | Van Coppenolle et al. |
| 8,977,112 B2 | 3/2015 | Yin et al. |

(Continued)

OTHER PUBLICATIONS

Seward, Zachary M.; The Cloud DVR is Going Mainstream Before Anyone Knows if it's Legal (Oct. 3, 2014).

*Primary Examiner* — Daquan Zhao
(74) *Attorney, Agent, or Firm* — Merchant & Gould P.C.

(57) ABSTRACT

In one embodiment, a cloud digital video recorder system includes a broadcast content receiver operative to receive broadcast content, a spill agent operative to generate a plurality of different time-period, non-user initiated, recording requests, and a content recorder operative to receive a plurality of user-initiated recording requests of a plurality of users, receive the plurality of different time-period, non-user initiated, recording requests of the spill agent, record the broadcast content into a content storage according to the plurality of user-initiated recording requests and the plurality of different time-period, non-user initiated, recording requests, receive a user-initiated retroactive recording request for a first portion of the broadcast content which has already been recorded to the content storage, and generate a pseudo-recording from the first portion of the broadcast content stored in the content storage according to the user-initiated retroactive recording request. Related apparatus and methods are also described.

20 Claims, 8 Drawing Sheets

(56) References Cited

U.S. PATENT DOCUMENTS

| | | |
|---|---|---|
| 9,055,268 B2 * | 6/2015 | Viveganandhan ....... H04N 5/76 |
| 9,106,798 B2 | 8/2015 | Hindle et al. |
| 9,124,911 B2 | 9/2015 | Rothschild et al. |
| 9,621,940 B2 | 4/2017 | Sarosi et al. |
| 9,716,903 B2 | 7/2017 | Cardona |
| 9,736,534 B2 | 8/2017 | Kharitonsky et al. |
| 2011/0030018 A1 * | 2/2011 | Mizuno ................... H04N 5/76 |
| | | 725/88 |
| 2011/0225617 A1 | 9/2011 | Rakib |
| 2015/0324379 A1 | 11/2015 | Danovitz et al. |
| 2017/0105036 A1 | 4/2017 | Viveganandhan |
| 2317/0105028 | 4/2017 | Ricker et al. |
| 2017/0142476 A1 * | 5/2017 | Wang ................... H04N 5/775 |

* cited by examiner

| | REQUEST ID | SOURCE | START TIME | END TIME |
|---|---|---|---|---|
| | ⋮ | ⋮ | ⋮ | ⋮ |
| 40 → | 3465134 | CH10 | 13:00 10/01/17 | 14:00 10/01/17 |
| 42 → | 8956743 | CH10 | 13:00 10/01/17 | 13:29 10/01/17 |
| 44 → | 7897541 | CH10 | 13:00 10/01/17 | 13:29 10/01/17 |
| 46 → | 5276131 | CH10 | 13:00 10/01/17 | 13:29 10/01/17 |
| | ⋮ | ⋮ | ⋮ | ⋮ |

Fig. 3

| RECORDING ID | SOURCE | START TIME | END TIME |
| --- | --- | --- | --- |
| 5613466 | CH10 | 13:00 10/01/17 | 14:00 10/01/17 |
| 2345289 | CH10 | 13:00 10/01/17 | 13:29 10/01/17 |
| ⋮ | ⋮ | ⋮ | ⋮ |

| REQUEST ID | RECORDING ID |
| --- | --- |
| 3465134 | 5613466 |
| 8956743 | 2345289 |
| 7897541 | 2345289 |
| 5276131 | 2345289 |
| ⋮ | ⋮ |

Fig. 4

| | REQUEST ID | SOURCE | START TIME | END TIME |
|---|---|---|---|---|
| | ⋮ | ⋮ | ⋮ | ⋮ |
| 56 → | 3465134 | CH10 | 13:00 10/01/17 | 14:00 10/01/17 |
| 54 → | ~~8956743~~ | ~~CH10~~ | ~~13:00 10/01/17~~ | ~~13:29 10/01/17~~ |
| 54 → | ~~7897541~~ | ~~CH10~~ | ~~13:00 10/01/17~~ | ~~13:29 10/01/17~~ |
| 54 → | ~~5276131~~ | ~~CH10~~ | ~~13:00 10/01/17~~ | ~~13:29 10/01/17~~ |
| | ⋮ | ⋮ | ⋮ | ⋮ |

| REQUEST ID | SOURCE | START TIME | END TIME |
|---|---|---|---|
| ⋮ | ⋮ | ⋮ | ⋮ |
| 56 → 3465134 | CH10 | 13:00 10/01/17 | 14:00 10/01/17 |
| 58 → 4363166 | CH10 | 13:00 10/01/17 | 13:29 10/01/17 |
| ⋮ | ⋮ | ⋮ | ⋮ |

| REQUEST ID | SOURCE | START TIME | END TIME |
|---|---|---|---|
| ⋮ | ⋮ | ⋮ | ⋮ |
| 56 → ~~3465134~~ | ~~CH10~~ | ~~13:00 10/01/17~~ | ~~14:00 10/01/17~~ |
| 58 → 4363166 | CH10 | 13:00 10/01/17 | 13:29 10/01/17 |
| ⋮ | ⋮ | ⋮ | ⋮ |

Fig. 11

CLOUD DVR SYSTEM WITH RETROACTIVE RECORDING

TECHNICAL FIELD

The present disclosure generally relates to a cloud digital video recorder (DVR) system with retroactive recording.

BACKGROUND

A cloud digital video recorder (DVR) system enables recording content in a cloud server. There are two main variants of cloud DVR operation. One is common copy, where physical recordings of the same content in the cloud DVR system may be shared between many users. Another is unique copy, where every user has his/her own physical recording in content storage. The choice between common copy and unique copy may be driven by local laws and regulations, for example. A cloud DVR system may operate as follows. Cloud DVR users create recording bookings in advance of, or during, an event broadcast. The bookings are generally stored in a cloud personal planner. A cloud recorder is triggered to start recording the selected event. In accordance with some systems, the event is segmented into short segments, which are recorded and stored. A segment or recording table may be created, which maintains a list of all the segments for a given user recording. If common copy is followed, then all recordings of the same content share the same segments. If unique copy is followed (or required), then unique copies of every segment are stored by the cloud recorder for each user recording. After some time, the recorded segments may be moved to an archive storage. When the user wants to play a recording, the segment or recording table is used to retrieve the playable segments for the recording. In accordance with common copy operation, when all recordings using the same segment are deleted, the segment is deleted from the storage, releasing resources. If the segments are retrieved from archive storage, the segments are reconstituted before they are sent to the player. The recording is deleted either by the user or by the system when reaching a predetermined retention time.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present disclosure, a cloud digital video recorder system including a broadcast content receiver operative to receive broadcast content, a spill agent operative to generate a plurality of different time-period, non-user initiated, recording requests, and a content recorder operative to receive a plurality of user-initiated recording requests of a plurality of users, receive the plurality of different time-period, non-user initiated, recording requests of the spill agent, record the broadcast content into a content storage the plurality of user-initiated recording requests and the plurality of different time-period, non-user initiated, recording requests, receive a user-initiated retroactive recording request for a first portion of the broadcast content which has already been recorded to the content storage, and generate a pseudo-recording from the first portion of the broadcast content stored in the content storage the user-initiated retroactive recording request.

DETAILED DESCRIPTION

Figure 1:
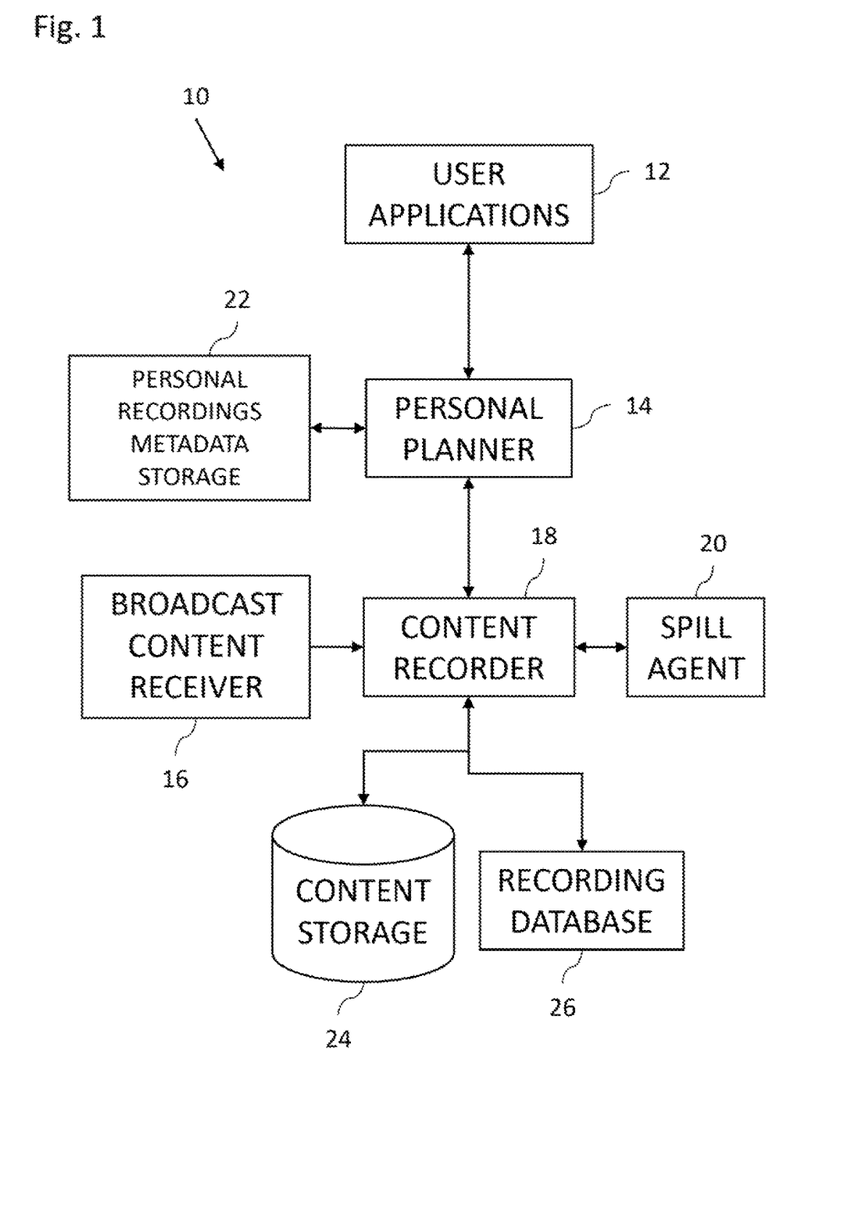
FIG. 1 is a block diagram view of a cloud digital video recorder system constructed and operative in accordance with an embodiment of the present disclosure.

Reference is now made to FIG. 1, which is a block diagram view of a cloud digital video recorder system 10 constructed and operative in accordance with an embodiment of the present disclosure. In addition to recording current and future broadcast events, the cloud DVR system 10 allows users to browse or search a list of cloud DVR recordings of past events, which are available in the cloud DVR system 10 (for example, in the cloud DVR libraries of other users in the system 10), and allow users to request a clone of selected recordings, so that they have their own copy of the content in their cloud DVR library.

The cloud DVR system 10 includes user applications 12, a personal planner 14, a broadcast content receiver 16, a content recorder 18, and a spill agent 20. The personal planner 14, the broadcast content receiver 16, the content recorder 18, and the spill agent 20 are typically run by a cloud server or cloud processing device. Each user application 12 may be run in the cloud with an end-user device front-end or entirely run as an end-user device application. The personal planner 14 manages personal recording for multiple users and uses a personal recording metadata storage 22, which is typically disposed in the cloud. The content recorder 18 uses a content storage 24 and a recording database 26. The content storage 24 and the recording database 26 are typically disposed in the cloud. The elements of the cloud DVR system 10 are now described in overview. A detailed description of the cloud DVR system 10 and its elements are described in more detail with reference to FIGS. 2-11.

Content is recorded from broadcast at the time of broadcast. The broadcast content receiver 16 receives broadcast content from one or more content providers and/or channel operators. The broadcast content is passed to the content recorder 18. The content recorder 18 filters the received broadcast content against content recording requests received from the personal planner 14. Content is recorded by the content recorder 18 as long as there is at least one party interested in recording the content. In accordance with "common copy" usage rights, the content recorder 18 stores recorded content in a manner such that a single instance of the content for a given time window is shared among any users who have requested recording of that content.

In order to enhance retroactive recording, described in more detail below, the spill agent 20 may be implemented in the cloud DVR system 10. The spill agent 20 sends non-user initiated recording requests to the content recorder 18 to request recording of content to be available for other users for retroactive recordings. For example, the spill agent 20 may send recording requests for all broadcast content (24 hours, 7 days a week) or most broadcast content (e.g., greater than 90% per day) of each channel, or all or certain broadcast content, for all, or certain, target channels. Each recording request of the spill agent 20 may request recording content for any suitable period of time, e.g., 1 hour or 1 day. The spill agent 20 then deletes each of the recordings after a historical recording window from when each recording was made. The spill agent 20 provides a minimal interest in all (or a subset of all) the content to ensure that all (or a subset of all) the past content in the historical recording window is deterministically available for retroactive recording independent of user activity. If the spill agent 20 is not implemented, then those recordings actually recorded by a user and still available in the content storage 24 are available for retroactive recording. It should be noted that the spill agent 20 is typically event agnostic and issues requests for time periods independent of event boundaries. In some embodiments, the spill agent 20 may be implemented to record all (or certain) events for all, or certain, channels.

The user applications 12 provide a user interface to allow users to book recordings in the personal planner 14, search for available content to book for recording, and request retroactive recordings. The personal recording metadata storage 22 stores the metadata of all the recorded broadcasted events stored in the cloud DVR system 10. The metadata is generally maintained in the system 10 as long as there are recordings that refer to the metadata. When there are no recordings referring to metadata, that metadata may be deleted or retained for a certain retention period after the broadcast date of the relevant content. The event metadata typically includes event boundaries as well as other event data. As the metadata is stored separately from the recorded content, a decoupling of the media recording from the associated events is provided. The metadata stored in the personal recording metadata storage 22 may be used to present to the users a "past catalog" list of events, from which retroactive recordings may be selected. The metadata may also be used to fill the metadata to present to the user in his/her library, once a retroactive recording is completed. The user discovers previously broadcast, now recorded, content which he/she is interested in, using some of the methods described in more detail with reference to FIG. 10 below.

The user's user application 12 requests the personal planner 14 to create a new recording, passing the identifier of the existing recording(s) as a parameter. The identifier can be a Uniform Resource Identifier (URI), by way of example only, which uniquely identifies a specific recording. The personal planner 14 creates an entry for the event in the personal recording metadata storage 22, and requests the content recorder 18 to generate a copy (pseudo-recording) of the specific recording. The personal planner 14 fills the metadata for the event, from the previously saved metadata.

The content recorder 18 generates a new record in the recording database 26 for the recording of the past time window. The content recorder 18 links the new record in the recording database 26 with the previously recorded common copy segments for the requested time window on the requested source (e.g., requested channel or service). If segments are missing for the requested past time window, then an indication of incomplete copy or failure is sent to the personal planner 14 by the content recorder 18. The user is able to view the new retroactive recording in his/her section of the personal planner 14 via his/her user application 12 and play the recording as explained above. If a business policy for predetermined retention time is applied to the original recording, the cloned recording may inherit the recording time from the original recording, so it will not exceed the predetermined retention time.

At the end of the historical recording window, which could extend for hours, days, weeks, or months depending on disk space or cloud DVR policy, the spill agent 20 deletes its copy of the content. Deletion of the copy generally includes removing the record in the recording database 26 associated with the spill agent's 20 recording request for the content. Similarly, a deletion request from a user of a recording general includes removing the record in the recording database 26 associated with the user's recording request for the content. The content recorder 18 includes a cleanup agent, which removes all content for which there is no interest (i.e. recording which have been deleted by all the requestors of the recording). Outside of the historical recording window, recordings actually requested by a user (and not subsequently deleted) can generally still be shared and are available for retroactive recording.

When cloning past unique copy events, the general method is as described above for the "common copy" case. However, in the unique copy case, all the segments from an original recording are duplicated and referenced by a new record in the recording database 26. The collection of the duplicated segments comprises the cloned event. Later on, the new segments may be archived, according to policy, for example by applying a deduplication algorithm. It should be noted that unique copy events generally cannot be retrieved from archive storage since the events are not generally identified as events at the archive level. It should be carefully noted that cloning past unique copy events, as described herein, is generally, but not necessarily, subject to obtaining appropriate content licensing and/or permission from the content provider.

The elements of the cloud DVR system 10 described herein may be implemented by any suitable processing hardware, for example, but not limited to, hardware including a single processor running all the software applications of the cloud DVR system 10 or multiple processors (possibly distributed over multiple machines) running the software application of the cloud DVR system 10.

Reference is now made to FIGS. 2-6, which are views of database tables 28 for use in the system 10 of FIG. 1. Reference is also made to FIG. 1. As described above, the content recorder 18 receives content recording requests for recording the broadcast content. The broadcast content is typically saved to the content storage 24 as a plurality of segments. Each segment includes a plurality of video/audio frames. The video frames may be saved with associated timing data such as broadcast time or recording time, by way of example only. Each segment may also be assigned a segment identification (ID) by the content recorder 18. Content data for different sources (e.g., channels or services) may be stored separately or together. If content data from different sources is stored together and the segment ID does not include an indication of the source, the segment ID is unique across the different sources. In such a case, the recording database 26 does not need to include a reference to the source.

Figure 2:
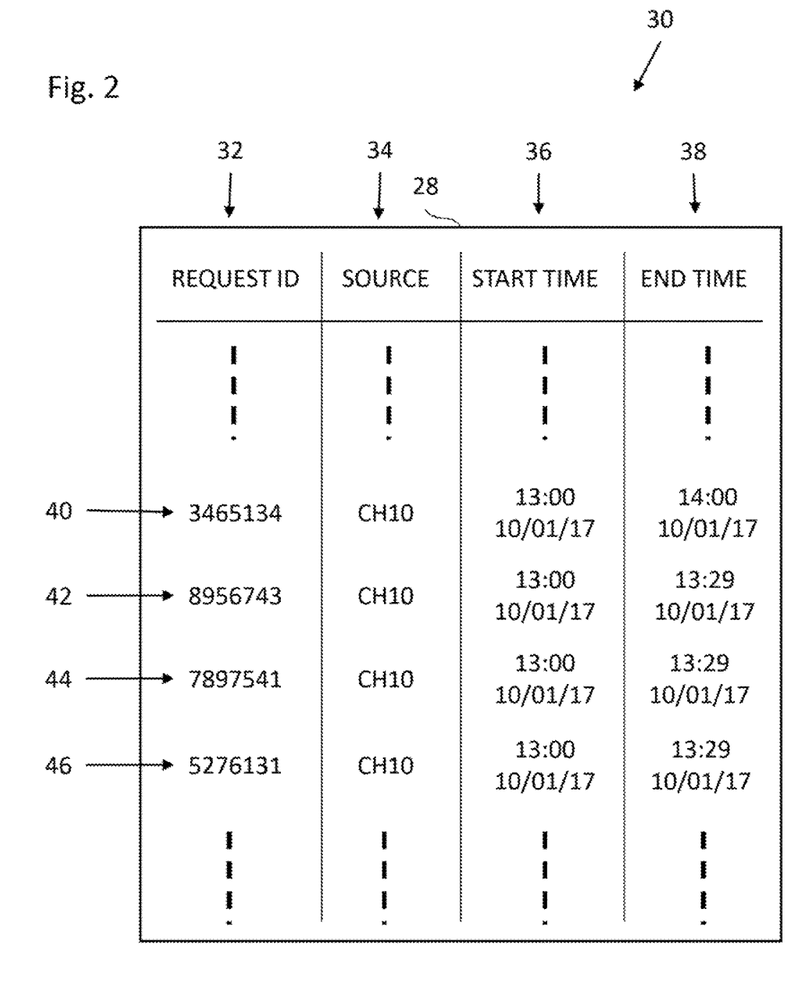
FIGS. 2-6 are views of database tables for use in the system of FIG. 1.

FIG. 2 shows an exemplary recording table 30. The content recorder 18 adds records to the recording table 30 so that the recording table 30 includes a link to the content segments stored in the content storage 24 for each of the recording requests. Table 30 includes a column 32 for request ID, a column 34 for source, a column 36 for start time, and a column 38 for end time. A first row 40 of data in the recording table 30 includes a request ID of 3465134 associated with a recording request from the spill agent 20 requesting recording of content on channel 10 (CH10) starting at 13:00 and ending at 14:00 on Oct. 1, 2017. A second row 42 of data in the recording table 30 includes a request ID of 8956743 associated with a recording request from a first user who wants to record a program on channel 10 starting at 13:00 and ending at 13:29 on Oct. 1, 2017. The request ID associated with the user request is typically generated by the personal planner 14 and passed to the content recorder 18 with the recording request, which may include the source, start time and end time. A third row 44 of data in the recording table 30 includes a request ID of 7897541 associated with a recording request from a second user who wants to record the same program. A fourth row 46 of data in the recording table 30 includes a request from a third user who wants to record the same program. It should be noted that the four rows 40-46 all cover the time period between 13:00 and 13:29 on Oct. 1, 2017 for channel 10. It can be seen that even if the three users mentioned above did not request to record the program on channel 10 between 13:00 and 13:29 on 1 Oct. 2017, the program would have been recorded by the content recorder 18 based on the spill agent 20 request to record channel 10 between 13:00 and 14:00.

It will be appreciated that the recording table 30 may include data for many days, weeks, months etc. A different recording table 30 may be generated and maintained for each source. Alternatively, one recording table 30 may be maintained for multiple sources. Based on the data in the recording table 30, recorded content may be identified in the content storage 24 based on timing data of the video/audio frames. Additionally, or alternatively, based on data in the recording table 30, recorded content may be identified in the content storage 24 based on segment ID wherein another table (not shown) is maintained mapping the start times and end times to segment ID. Additionally, or alternatively, the recording table 30 is generated to include the segment IDs of the start time and end time instead of, or in additional to, the start time and end time, so that recorded content may be identified in the content storage 24 based on segment ID.

If "unique copy" is used whereby each recording request results in a duplication of segments of the same content in the content storage 24, the records in the recording table 30 refer to different segments for each unique copy. In such a case, recorded content may be identified in the content storage 24 based on segment ID wherein the recording table 30 is generated to include the segment IDs of the start time and end time instead of, or in additional to, the start time and end time. Alternatively, the source column 34 may be used to identify a personal storage area of the requesting user in content storage 24, and the start and end times and/or start and end segments in the personal storage area may be used to identify the recorded content in the content storage 24.

It should be noted that maintaining the recorded content separately from the recording database 26 and the personal recording metadata storage 22 provides more flexibility in the cloud DVR system 10. For example, if the actual broadcast time of a program item differs from the scheduled time, the records in the recording database 26 referring to that program item may even be amended after the broadcast to refer to the actual start and end time of the program item so that when the program item is recalled for playback the whole program item may be played back without additional sections before the start and/or after the end of the program item.

Figure 3:
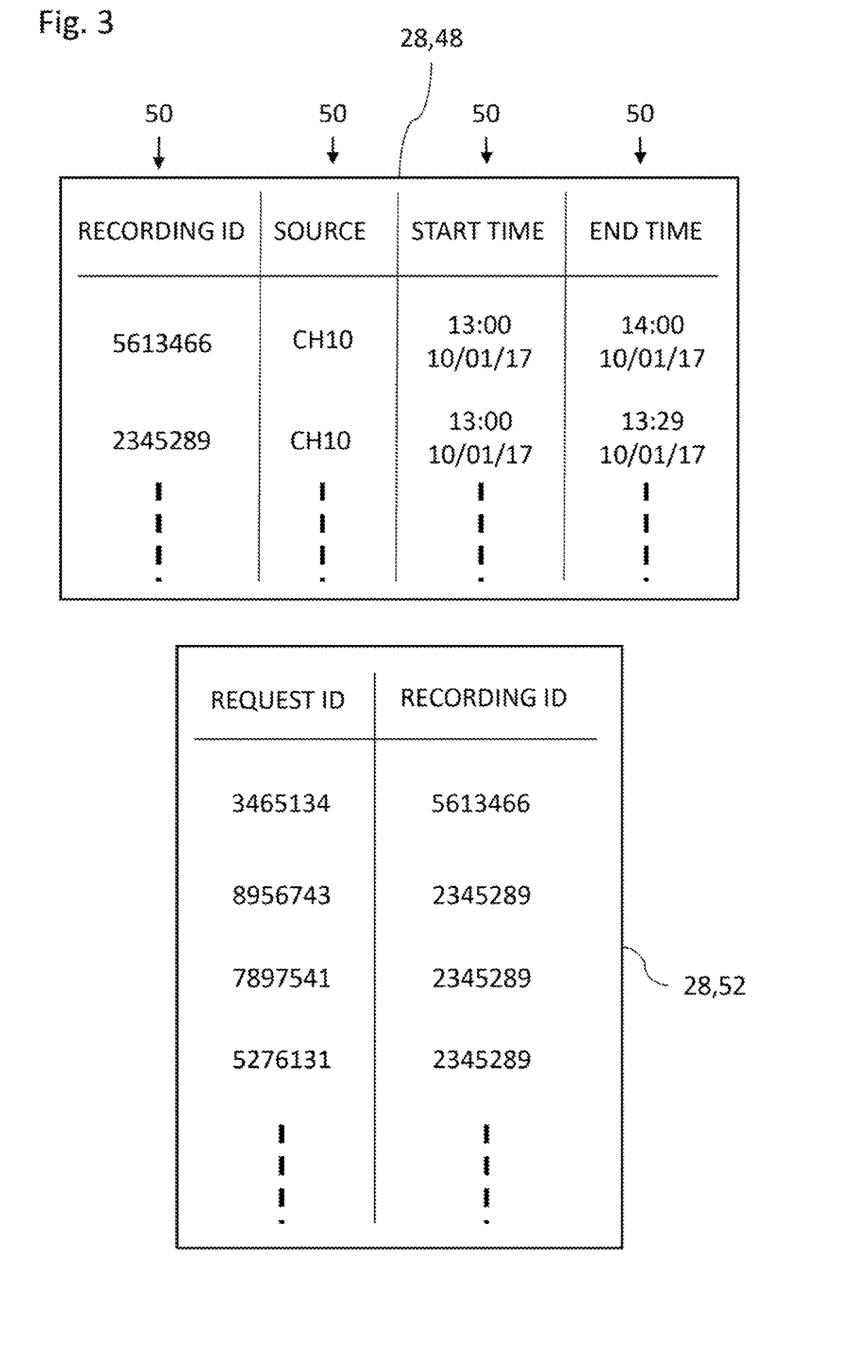

FIG. 3 shows two database tables 28 including a database table 48 and a database table 52. The first database table 48 includes four columns 50, one for recording ID, one for source, one for start time, and one for end time. It will be appreciated that start time and end time could be replaced by, or supplemented by, start segment and end segment. Recording ID is typically generated by the content recorder 18 for one or more recording requests that request recording of the same program item or the same timing and channel. The second database table 52 links request ID to recording ID. The database table 52 shows that recording ID 5613466 is based on a single recording request (request ID 3465134) and recording ID 2345289 is based on the three recording requests shown in table 52. It will be appreciated that tables 48, 52 provide similar data relationships as provided by the recording table 30 of FIG. 2.

Figure 4:
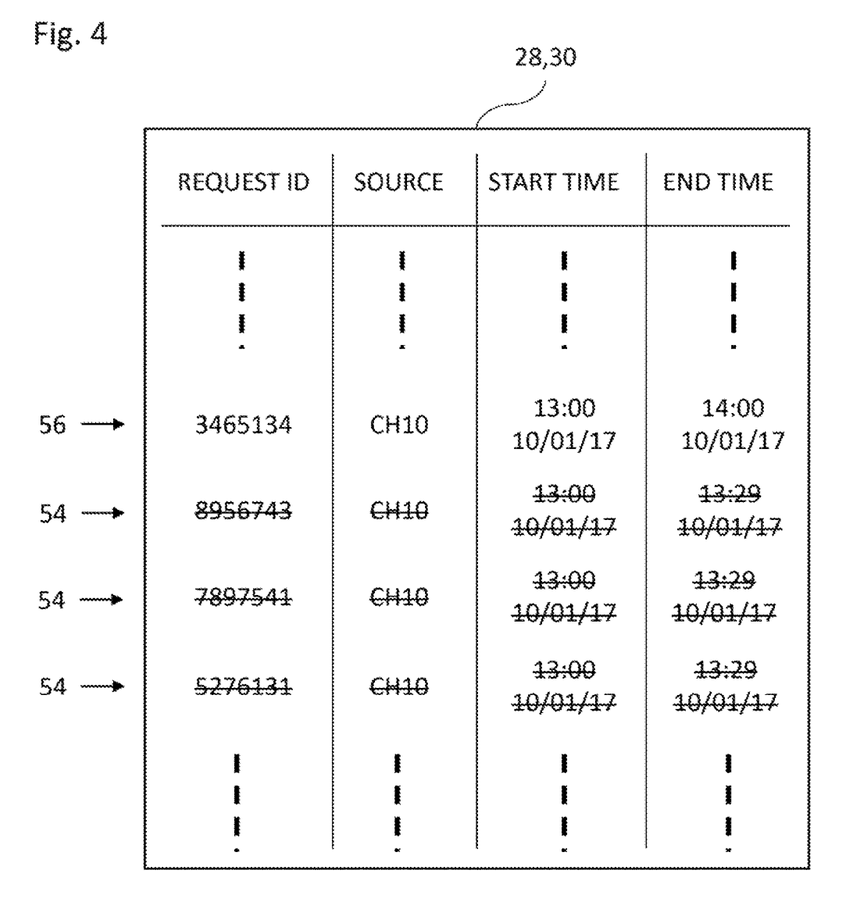

FIG. 4 shows the recording table 30 of FIG. 2 with three records 54 in the process of being deleted. When a user requests deletion of a recording, the content recorder 18 removes the record 54 of the content request from the recording table 30. For "common copy" usage, removing the record 54 from the recording table 30 "deletes" that recording for that user. When a segment stored in the content storage 24 is no longer referred to by any recording requests in the recording table 30 (as ascertained by the content recorder 18), the content recorder 18 removes that segment from the content storage 24. Purging of the content storage 24 may be performed when the last record referring to a segment is removed from the recording table 30 or on a periodic basis. For "unique copy" usage, in addition to removing the record from the recording table 30, the content recorder 18 deletes the associated segments from the content storage 24. FIG. 4 shows that even though all the user-initiated recordings have been deleted for channel 10 between 13:00 and 13:29 on Oct. 1, 2017, the recording request initiated by the spill agent 20 for channel 10 between 13:00 and 14:00 on Oct. 1, 2017 still exists (as a record 56 in the recording table 30) as the recording request is still within the historical recording window.

Figure 5:
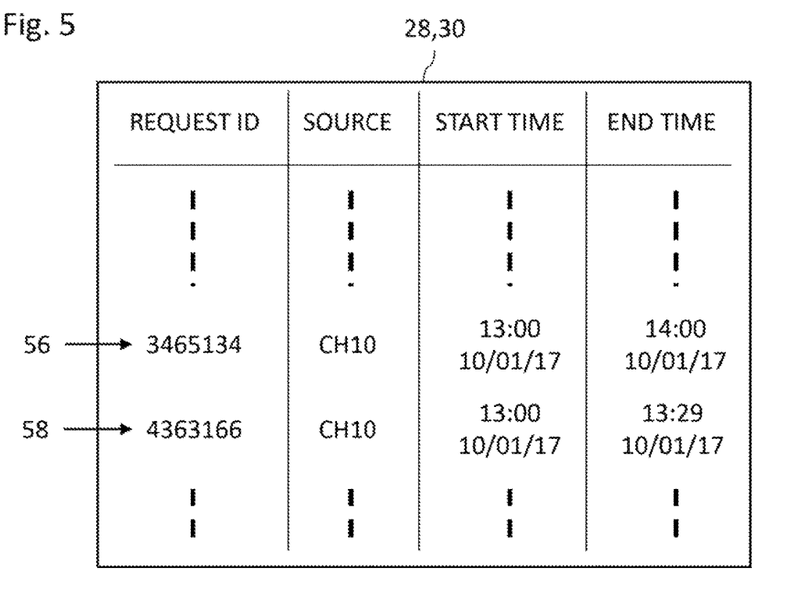

FIG. 5 shows the recording table 30 with a newly added record 58 (added by the content recorder 18) for recording request 4363166, which is a retroactive recording request for a content item, which was previously broadcast on channel 10 between 13:00 and 13:29 on Oct. 1, 2017. The retroactive recording request may be fulfilled by the content recorder 18 because the segments for that content item exist in the content storage 24 as evidenced by the record 56 associated with the recording request initiated by the spill agent 20 for channel 10 between 13:00 and 14:00 on Oct. 1, 2017.

Figure 6:
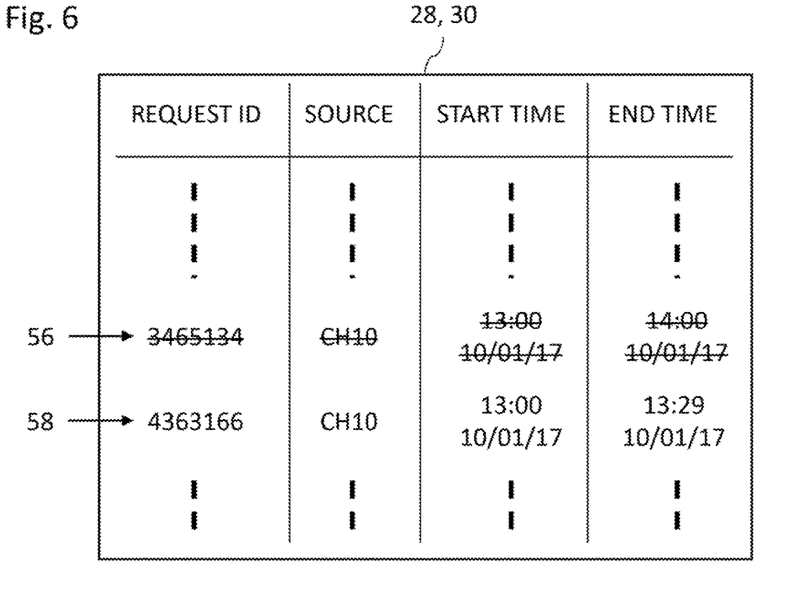

FIG. 6 shows the record 56 being deleted from the recording table 30 at the end of the historical time window for the record 56. The record 56 is deleted by the content recorder 18. The record 58 associated with the retroactive recording request remains in the recording table 30 even after the historical time window of the record 56. The segments associated with the retroactive recording request stored in the content storage 24 are retained as long as the retroactive recording request is not deleted by the user or archived by the content recorder 18. Additionally, in accordance with the "common copy" usage, if additional retroactive recording requests associated with the same content as the record 58 are fulfilled by the content recorder 18, the segments are not removed from the content storage 24 until all content recording requests for the segments are deleted. If there are no content requests existing in the recording table 30 associated with channel 10 between 13:30 and 14:00 on Oct. 1, 2017, then the segments associated with that content are removed from the content storage 24 by the content recorder 18 as part of the deletion of the record 56 from the recording table 30. Alternatively, the segments associated with that content are removed from the content storage 24 by the content recorder 18 when a periodic purge of the content storage 24 is performed.

Figure 7:
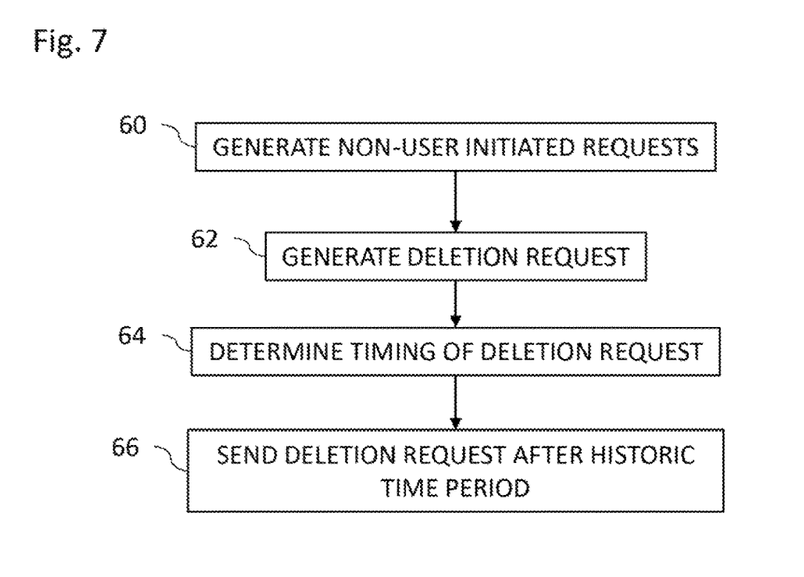
FIG. 7 is a flow chart showing exemplary steps in a method of operation of a spill agent in the system of FIG. 1.

Reference is now made to FIG. 7, which is a flow chart showing exemplary steps in a method of operation of the spill agent 20 in the system 10 of FIG. 1. Reference is also made to FIG. 1. The spill agent 20 is operative to generate (block 60) a plurality of different time-period non-user initiated recording requests. In accordance with some embodiments of the present disclosure, the spill agent 20 is operative to generate the different time-period, non-user initiated, recording requests to include recording requests for all, or a sub-set of all (such as most broadcast content, e.g., greater than 90% per day of each channel or a certain channel or channels), of the broadcast content received by the receiver, e.g. the recording requests are temporally back-to-back for each selected channel. The non-user initiated recording requests may be of equal time period, e.g., each request being an hour or two hour duration, or unequal time periods. The spill agent 20 is operative to generate (block 62) a deletion request to the content recorder to delete each different time-period, non-user initiated, recording request. The spill agent 20 is operative to time (block 64) the sending of the deletion request for each of the plurality of different time-period, non-user initiated, recording requests so that the broadcast content associated with each of the plurality of different time-period, non-user initiated, recording requests is retained in the content storage for the historic time window (or more). It will be appreciated that the step of block 64 may proceed the step of block 62. The spill agent 20 is operative to send (block 66) the deletion request (for each of the plurality of different time-period, non-user initiated, recording requests) to the content recorder 18 to delete each one of the plurality of different time-period, non-user initiated, recording requests after the historic time period of the corresponding recording request.

Figure 8:
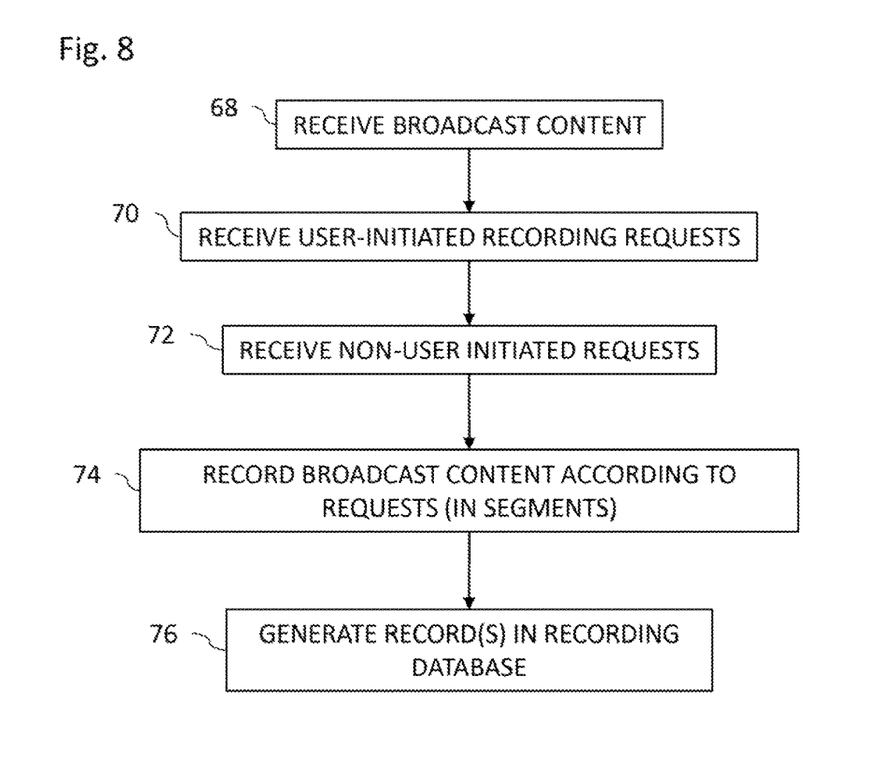
FIG. 8 is a flow chart showing exemplary steps in a method of recording broadcast content in the system of FIG. 1.

Reference is now made to FIG. 8, which is a flow chart showing exemplary steps in a method of recording broadcast content in the system 10 of FIG. 1. Reference is also made to FIG. 1. The broadcast content receiver 16 is operative to receive (block 68) broadcast content. The content recorder 18 is operative to receive (block 70) a plurality of user-initiated recording requests associated with a plurality of users from the personal planner 14. The content recorder 18 is operative to receive (block 72) the different time-period, non-user initiated, recording requests of the spill agent 20 from the spill agent 20. It should be noted that optionally, the requests from the spill agent 20 are requested by the spill agent 20 via the personal planner 14 to the content recorder 18.

The content recorder 18 is operative to record (block 74) the broadcast content into the content storage 24 according to the plurality of user-initiated recording requests and the plurality of different time-period, non-user initiated, recording requests. The content recorder 18 is operative to store the broadcast content in a plurality of segments (or portions) in the content storage 24. A video duration of each segment is generally shorter than one minute and typically between 2-6 seconds duration. When "common copy" is used, one copy of each segment is stored in the content storage 24. When "unique copy" is used, each segment is duplicated in the content storage 24 for every recording request for that segment.

The content recorder 18 is operative to generate (block 76) a record in the recording database 26 for each user-initiated recording request and each different time-period, non-user initiated, recording request. The record in the recording database 26 for a request is linked to a portion (the segments) of the broadcast content stored in the content storage. In some embodiments, the record in the recording database 26 for that request includes the segment identification of the segments (of that request) stored in the content storage. For "common copy" usage, a plurality of records (which may include the user and non-user initiated recording requests) in the recording database 26 may be linked to the same portion (segments) of the broadcast content stored in the content storage 24. For "unique copy" usage, each record in the recording database 26 refers to the corresponding duplicated portion or segments for the recording request of that record. It will be appreciated that the term "record" in the recording database 26 may be understood to include one or more records in one or more database tables in the recording database 26 that define a certain database relationship.

Figure 9:
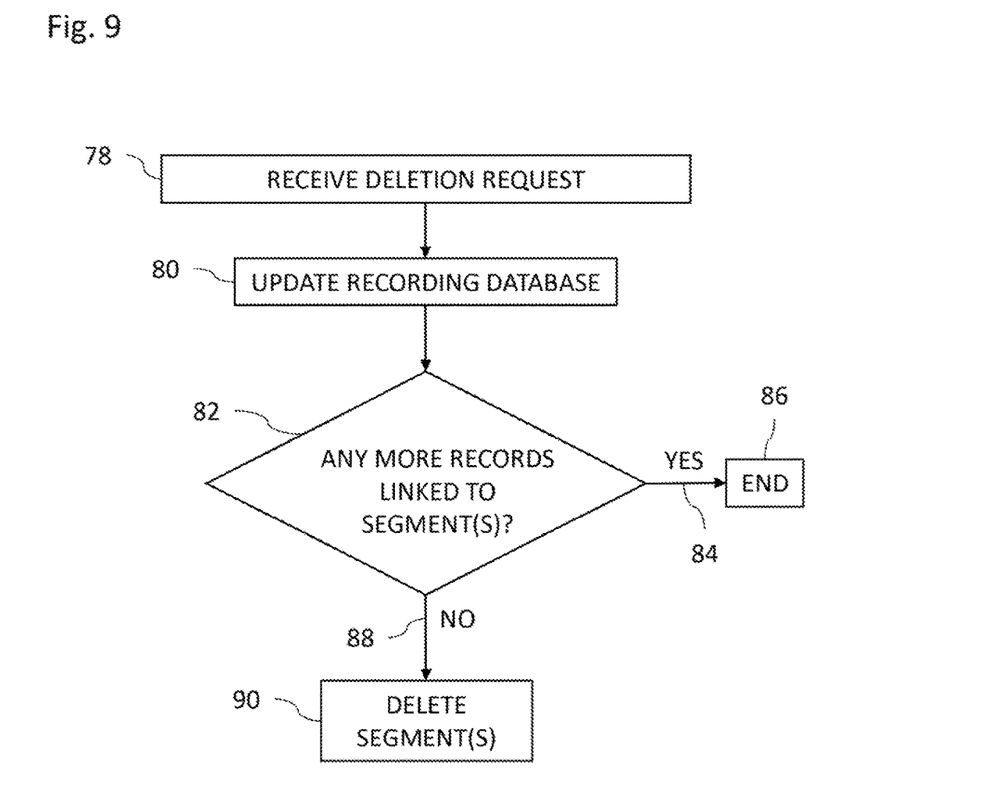
FIG. 9 is a flow chart showing exemplary steps in a method of recording deletion in the system of FIG. 1.

Reference is now made to FIG. 9, which is a flow chart showing exemplary steps in a method of deleting recordings in the system 10 of FIG. 1. Reference is also made to FIG. 1. The content recorder 18 is operative to receive (block 78) a deletion request from a user via the personal planner 14 or from the spill agent 20. The content recorder 18 is operative to update (block 80) the recording database 26 to remove the record (associated with the deletion request) in the recording database 26. If the removed record is associated with a "unique copy" in the content storage 24, the segments linked by the removed record are removed from the content storage 24 by the content recorder 18. If the removed record is associated with a "common copy" in the content storage 24, the content recorder 18 determines (decision block 82), using a database lookup or other routine, if there are any more records (in the recording database 26) that are linked to the segments linked by the removed record. If there are more records linked to the segments (branch 84), the deletion method ends (block 86). If there are no more records linked to the segments (branch 88), the content recorder 18 deletes (block 90) the linked segments. The steps of blocks 88 and 90 may be performed after each respective record is removed from the recording database 26 or may be performed periodically as described above. It should be noted that removal of a record from the recording database 26 might be implemented by removing the record from the recording database 26. In some embodiments, removal of a record from the recording database 26 might be implemented by marking the record as inactive. Similarly, removal of a segment or portion from the content storage 24 may be implemented by removing the segment or portion from the content storage 24 or by marking the segment or portion as inactive.

Figure 10:
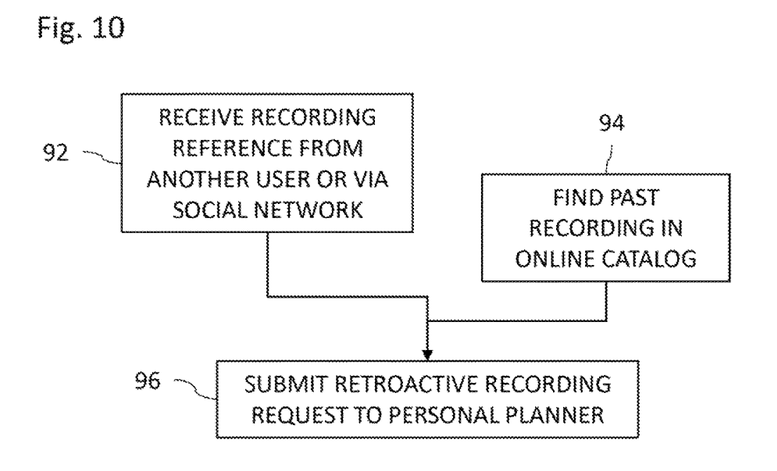
FIG. 10 is a flow chart showing exemplary steps in a method of selecting retroactive recording in the system of FIG. 1.

Reference is now made to FIG. 10, which is a flow chart showing exemplary steps in a method of selecting retroactive recording in the system 10 of FIG. 1. Reference is also made to FIG. 1. In order for a user to clone an existing recording, the original recording had to be discovered by that user. There are multiple ways to discover existing content. Some exemplary discovery methods are now described.

A user may receive (block 92) a recording reference from another user or via a social network. For example, a first user may send a link to one of his/her recordings to a second user in the system 10, for example using an Extensible Messaging and Presence Protocol (XMPP) message addressed to an application of the second user with the link uniquely identifying the recording. By way of another example, an operator of the cloud DVR system 10 may implement a social media application between the users, which allow users to publish links to recordings that they recommend. His or her friend may then submit one of the links to the personal planner 14 via the user application 12 thereby submitting (block 96) a retroactive recording request to the personal planner 14.

A user may find (block 94) past recordings in an online catalog. For example, the cloud DVR system 10 may show past recorded events in some online catalog (for example, via the personal planner 14 and the user applications 12). Optionally, the catalog may be configured to show popular events recorded by a certain number of users. The user is then able to select one of the recordings in the personal planner 14 via the user application 12 thereby submitting (block 96) a retroactive recording request to the personal planner 14.

Figure 11:
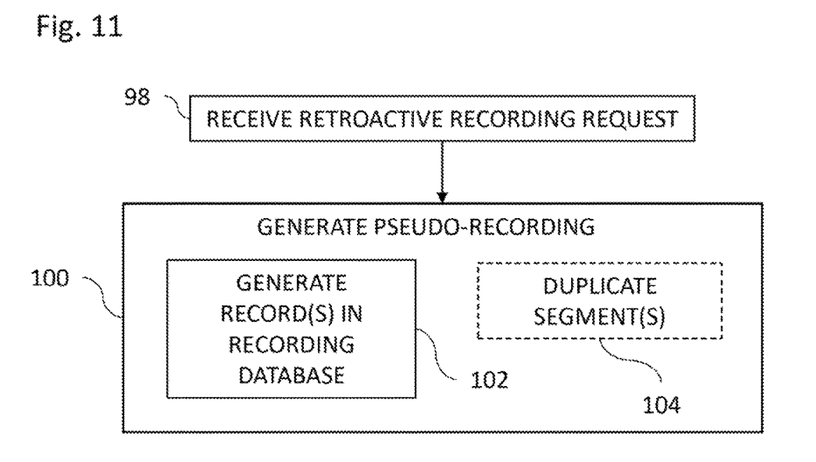
FIG. 11 is a flow chart showing exemplary steps in a method of generating a pseudo-recording in the system of FIG. 1.

Reference is now made to FIG. 11, which is a flow chart showing exemplary steps in a method of generating a pseudo-recording in the system 10 of FIG. 1. Reference is also made to FIG. 1. The content recorder 18 is operative to receive (block 98) a user-initiated retroactive recording request, from the personal planner 14, for a portion of broadcast content, which has already been recorded to the content storage 24. The content recorder 18 is operative to generate (block 100) a pseudo-recording from the portion of the broadcast content stored in the content storage according to the user-initiated retroactive recording request. The step of block 100 is now described in more detail first with reference to "common copy" usage and then with reference to "unique copy" usage.

With "common copy" usage, the content recorder 18 is operative to generate (block 102) a record in the recording database 26 for the user-initiated retroactive recording request. The record in the recording database 26 for the request links the request to the portion of the broadcast content stored in the content storage 24 and/or the record in the recording database 26 for the request includes the segment identification of the segments (of the portion) stored in the content storage 24. Therefore, the portion of the broadcast content stored in the content storage 24 is linked to by a plurality of records (including the record for the user-initiated retroactive recording request) in the recording database 26. Therefore, adding the record to the recording database 26 for the user-initiated retroactive recording request corresponds to the pseudo-recording, i.e., provides a recording of the content for the requesting user.

With "unique copy" usage, the content recorder 18 is operative to duplicate (block 104) the portion (segments) of the broadcast content in the content storage 24 yielding the pseudo-recording. The content recorder 18 is operative to generate (block 102) the record in the recording database 26 for the user-initiated retroactive recording request linking the user-initiated retroactive recording request to the pseudo-recording (duplicated portion) in the content storage 24.

With both "common copy" and "unique copy" usage, the personal planner 14 is operative to copy metadata about a content item associated with the user-initiated retroactive recording request from data of a pre-existing recording stored in a personal recordings metadata storage 22 to a new record (generated for the user-initiated retroactive recording request) in the personal recordings metadata storage 22.

In practice, some or all of the functions of the cloud DVR system 10 may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A cloud digital video recorder system comprising:
a broadcast content receiver operative to receive broadcast content;
a spill agent operative to generate a plurality of different time-period, non-user initiated, recording requests; and
a content recorder operative to:
receive a plurality of user-initiated recording requests of a plurality of users;
receive the plurality of different time-period, non-user initiated, recording requests of the spill agent;
record the broadcast content into a content storage according to the plurality of user-initiated recording requests and the plurality of different time-period, non-user initiated, recording requests;
receive a user-initiated retroactive recording request for a first portion of the broadcast content which has already been recorded to the content storage; and
generate a pseudo-recording from the first portion of the broadcast content stored in the content storage according to the user-initiated retroactive recording requests, wherein content recorder being operative to generate the pseudo-recording comprises the content recorder being operative to:
duplicate the first portion of the broadcast content in the content storage yielding the pseudo-recording,
generate a record in a recording database for the user-initiated retroactive recording request linking to the user-initiated retroactive recording request to the pseudo-recording in the content storage, and
generate a record in the recording database for the user-initiated retroactive recording request linking to the portion of the broadcast content already stored in the content storage in response to previous recording requests.

2. The system according to claim 1, wherein the spill agent is operative to send a deletion request to the content recorder to delete each one of the plurality of different time-period, non-user initiated, recording requests.

3. The system according to claim 2, wherein the spill agent is operative to time the sending of the deletion request for each of the plurality of different time-period, non-user initiated, recording requests so that the broadcast content associated with each of the plurality of different time-period, non-user initiated, recording requests is retained in the content storage for at least a historic time window.

4. The system according to claim 1, wherein the spill agent is operative to generate the plurality of different time-period, non-user initiated, recording requests to include recording requests for more than 90% of the broadcast content received by the receiver per day of at least one channel.

5. The system according to claim 1, wherein:
the content recorder is operative to store the broadcast content in a plurality of segments in the content storage; and
a video duration of each one segment of the plurality of segments is shorter than one minute.

6. The system according to claim 5, wherein:
each one segment of the plurality of segments has a segment identification;
the content recorder is operative to generate a record in a recording database for each one request of: the plurality of user-initiated recording requests; the plurality of different time-period, non-user initiated, recording requests; and the user-initiated retroactive recording request; and
the record in the recording database for the one request includes the segment identification of at least one of the plurality of segments stored in the content storage.

7. The system according to claim 1, wherein:
the content recorder is operative to generate the record in a recording database for each one request of: the plurality of user-initiated recording requests; the plurality of different time-period, non-user initiated, recording requests; and the user-initiated retroactive recording request; and
the record in the recording database for the one request is linked to a portion of the broadcast content stored in the content storage.

8. The system according to claim 7, wherein:
a plurality of records in the recording database are linked to the first portion of the broadcast content stored in the content storage; and
the plurality of records includes the record for the user-initiated retroactive recording request, the record for the user-initiated retroactive recording request corresponding to the pseudo-recording.

9. The system according to claim 1, further comprising a personal planner operative to copy metadata about a content item associated with the user-initiated retroactive recording request from data of a pre-existing recording stored in a personal recordings metadata storage to a new record in the personal recordings metadata storage, the new record being generated for the user-initiated retroactive recording request.

10. A cloud digital video recorder method comprising:
receiving broadcast content;
generating a plurality of different time-period, non-user initiated, recording requests;
receiving a plurality of user-initiated recording requests of a plurality of users;
receiving the plurality of different time-period, non-user initiated, recording requests;
recording the broadcast content into a content storage according to the plurality of user-initiated recording requests and the plurality of different time-period, non-user initiated, recording requests;
receiving a user-initiated retroactive recording request for a first portion of the broadcast content which has already been recorded to the content storage; and
generating a pseudo-recording from the first portion of the broadcast content stored in the content storage according to the user-initiated retroactive recording request, wherein generating the pseudo-recording comprises:
duplicating the first portion of the broadcast content in the content storage yielding the pseudo-recording,
generating a record in a recording database for the user-initiated retroactive recording request linking the user-initiated retroactive recording request to the pseudo-recording in the content storage, and
generating a record in the recording database for the user-initiated retroactive recording request linking to the portion of the broadcast content already stored in the content storage in response to previous recording requests.

11. The method according to claim 10, further comprising sending a deletion request to delete each one of the plurality of different time-period, non-user initiated, recording requests.

12. The method according to claim 11, further comprising timing the sending of the deletion request for each of the plurality of different time-period, non-user initiated, recording requests so that the broadcast content associated with each of the plurality of different time-period, non-user initiated, recording requests is retained in the content storage for at least a historic time window.

13. The method according to claim 10, further comprising generating the plurality of different time-period, non-user initiated, recording requests to include recording requests for more than 90% of the broadcast content received by the receiver per day of at least one channel.

14. The method according to claim 10, further comprising storing the broadcast content in a plurality of segments in the content storage, wherein a video duration of each one segment of the plurality of segments is shorter than one minute.

15. The method according to claim 14, wherein each one segment of the plurality of segments has a segment identification, the method further comprising generating a record in a recording database for each one request of: the plurality of user-initiated recording requests; the plurality of different time-period, non-user initiated, recording requests; and the user-initiated retroactive recording request, the record in the recording database for the one request including the segment identification of at least one of the plurality of segments stored in the content storage.

16. The method according to claim 10, further comprising generating the record in a recording database for each one request of: the plurality of user-initiated recording requests; the plurality of different time-period, non-user initiated, recording requests; and the user-initiated retroactive recording request, wherein the record in the recording database for the one request is linked to a portion of the broadcast content stored in the content storage.

17. The method according to claim 16, wherein:
    a plurality of records in the recording database are linked to the first portion of the broadcast content stored in the content storage; and
    the plurality of records includes the record for the user-initiated retroactive recording request, the record for the user-initiated retroactive recording request corresponding to the pseudo-recording.

18. The method according to claim 10, further comprising copying metadata about a content item associated with the user-initiated retroactive recording request from data of a pre-existing recording stored in a personal recordings metadata storage to a new record in the personal recordings metadata storage, the new record being generated for the user-initiated retroactive recording request.

19. A non-transitory computer-readable medium that stores a set of instructions which when executed perform a method executed by the set of instructions comprising:
    receiving broadcast content;
    generating a plurality of different time-period, non-user initiated, recording requests;
    receiving a plurality of user-initiated recording requests of a plurality of users;
    receiving the plurality of different time-period, non-user initiated, recording requests;
    recording the broadcast content into a content storage according to the plurality of user-initiated recording requests and the plurality of different time-period, non-user initiated, recording requests;
    receiving a user-initiated retroactive recording request for a first portion of the broadcast content which has already been recorded to the content storage; and
    generating a pseudo-recording from the first portion of the broadcast content stored in the content storage according to the user-initiated retroactive recording request, wherein generating the pseudo-recording comprises:
        duplicating the first portion of the broadcast content in the content storage yielding the pseudo-recording,
        generating a record in a recording database for the user-initiated retroactive recording request linking the user-initiated retroactive recording request to the pseudo-recording in the content storage, and
        generating a record in the recording database for the user-initiated retroactive recording request linking to the portion of the broadcast content already stored in the content storage in response to previous recording requests.

20. The non-transitory computer-readable medium of claim 19, wherein the method further comprising storing the broadcast content in a plurality of segments in the content storage, wherein a video duration of each one segment of the plurality of segments is shorter than one minute.

* * * * *